United States Patent
Faitelson et al.

(10) Patent No.: US 9,846,701 B2
(45) Date of Patent: Dec. 19, 2017

(54) POLICIES FOR OBJECTS COLLABORATIONS

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, LTD., Herzliya (IL)

(*) Notice: Subject to any disclaimer, the term of this patent is extended or adjusted under 35 U.S.C. 154(b) by 661 days.

(21) Appl. No.: 14/294,159

(22) Filed: Jun. 3, 2014

(65) Prior Publication Data
US 2015/0347446 A1    Dec. 3, 2015

(51) Int. Cl.
*G06F 15/16*    (2006.01)
*G06F 17/30*    (2006.01)
*H04L 29/08*    (2006.01)

(52) U.S. Cl.
CPC ........ *G06F 17/30165* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2005/0008163 A1* | 1/2005 | Leser | ........................ | H04L 9/08 380/281 |
| 2005/0060281 A1* | 3/2005 | Bucher | ............. | G06F 17/30011 |
| 2008/0059579 A1* | 3/2008 | Maes | ...................... | H04L 51/04 709/204 |
| 2012/0254996 A1* | 10/2012 | Wilbourn | ............ | H04L 61/1511 726/22 |
| 2013/0268562 A1 | 10/2013 | Faitelson | | |
| 2014/0033265 A1* | 1/2014 | Leeds | ..................... | G06F 21/10 726/1 |
| 2014/0033324 A1* | 1/2014 | Kiang | .................... | H04L 63/10 726/27 |

(Continued)

FOREIGN PATENT DOCUMENTS

WO    2011/092685    8/2011

OTHER PUBLICATIONS

Wikipedia: Collaborative software Internet Article. (May 30, 2014). Retrieved from the Internet: URL:http://en.wikipedia.org/w/index.php?title=Collaborative software&oldid=610852628.

(Continued)

*Primary Examiner* — Natisha Cox
(74) *Attorney, Agent, or Firm* — Soroker Agmon Nordman (57) ABSTRACT

A computerized method for managing collaboration in a computerized system, comprising repeatedly applying any one of rules defined in the computerized system pertaining to objects of the computerized system, wherein the any one of the rules comprises an at least one condition concerning collaborativity of an object to which the any one of the rules pertains and the at least one condition is based on metadata of the object, by evaluating any one of conditions in the any one of the rules, thereby determining collaborativity of any one of the objects to which the any one of the rules pertains, and an apparatus for performing the same.

25 Claims, 5 Drawing Sheets

(56) References Cited

U.S. PATENT DOCUMENTS

2015/0248384 A1* 9/2015 Luo .................. G06Q 10/00
715/229

OTHER PUBLICATIONS

Wikipedia: "Document collaboration". Internet Article. (May 7, 2014) Retrieved from the Internet: URL:http://en.wikipedia.org/w/index.php?title=Document collaboration&oldid=607509954.

Tim Mangan: "Varonis: A product for Auditing ACLs and file usage", Internet Article, (Mar. 11, 2008), Retrieved from the Internet: URL:http://www.brianmadden.com/blogs/timmangan/archive/2008/03/11/varonis-a-productfor-auditing-acls-and-file-usage.aspx.

Anonymous: "Varonis—Audit Tools for Peace of Mind", Internet Article, (Oct. 20, 2013), Retrieved from the Internet: URL:http://blog.options-it.com/post/61099534671/varonis-audit-tools-for-peace-of-mind.

WeSecureNL: "Varoni s DEMO, Control s access, files, data, SharePoint, Echange and much more", YouTube Video, (Sep. 17, 2012), Retrieved from the Internet: URL:https://www.youtube.com/watch?v=bQghFk2k5Hw.

Robert MacMillan: "Varonis Data Advantage Over view", YouTube Video, (Dec. 18, 2009) Retrieved from the Internet: URL:https:www.youtube.com/watch?v= 80 1e-5TRCY.

DataGovernance: "Varonis DatAnswers", YouTube Video, (May 9, 2014) Retrieved from the Internet: URL:https://www.youtube.com/watch?v=h03MRx08sDo.

DataGovernance: "What makes Varonis DatAnswers search results relevant?". YouTube Video. (May 9, 2014). Retrieved from the Internet: URL:https://www.youtube.com/watch?v=XensqkBSx2w.

How does Varonis DatAnswers make search secure?. YouTube Video. (May 9, 2014). Retrieved from the Internet: URL:https://www.youtube.com/watch?v=In5DUXpH2F4&index=40&list=UUE9xUuH4lhIUDOFR10H1NNg.

DataClassification: "Varonis CEO and Co-Founder". YouTube Video. (Oct. 27, 2011). Retrieved from the Internet: URL:https://www.youtube.com/watch?v=FXp4z7bZ Tc.

* cited by examiner

Fig. 1

Prior Art

POLICIES FOR OBJECTS COLLABORATIONS

BACKGROUND

The present disclosure generally relates to handling of objects in a multi-platform computerized system and more specifically to collaboration of storage elements therein.

Computers systems or computerized systems, particularly such of an enterprise, generally comprise numerous linked computers that store and handle plenty of objects such as files. Collaboration of storage elements (objects such as files and folders) in computers or computerized systems is known in the art. For example, sharing windows office files (Microsoft Inc.) or PDF files (Adobe Systems Inc.).

SUMMARY

One exemplary embodiment of the disclosed subject matter is a method for a computerized method for managing collaboration in a computerized system, comprising repeatedly applying any one of rules defined in the computerized system pertaining to objects of the computerized system, wherein the any one of the rules comprises an at least one condition concerning collaborativity of an object to which the any one of the rules pertains and the at least one condition is based on metadata of the object, by evaluating any one of conditions in the any one of the rules, thereby determining collaborativity of any one of the objects to which the any one of the rules pertains, wherein the computerized method is carried out by an at least one computerized apparatus of the computerized system.

Another exemplary embodiment of the disclosed subject matter is a computerized system for managing collaboration, comprising an at least first computerized apparatus configured for defining rules pertaining to objects of the computerized system with conditions concerning collaborativity of the objects to which the rules pertain based on metadata of the objects, and an at least second computerized apparatus configured for repeatedly applying the rules by evaluation of the conditions to determined collaborativity of the objects to which the rules pertain.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

DETAILED DESCRIPTION

In the context of the present disclosure, without limiting, the term 'computerized system' implies a system comprising a plurality of computing apparatuses, such as computers, communicating therebetween and having and/or sharing and/or communicating with a data storage device. The data storage device is also referred to as 'data storage' or 'storage'.

For brevity, referring to an operation of and/or by a computerized system implies an operation of and/or by one or more components and/or of the computerized system, such as by one or more computers of the computerized system.

Generally, without limiting, a computerized system comprises several computers in a range between about 10 computers to about 1000 computers or more. Optionally, a computerized system comprises less than 10 computers, not precluding having one computer as, for example, a mainframe computer.

Generally, in the context of the present disclosure the computerized system belongs and/or is a part of an organization, such as a business, department of a government or institution or an association.

In the context of the present disclosure, without limiting, the term 'object' implies a data element of computerized system, such as folder, a file or a database.

In the context of the present disclosure, without limiting, attributes or metadata of an object imply an at least one characteristic of the object such as permission to access the object, content classification of the object, audit trail of activities of or on or with the object, type of the object and other metadata such as users group of a computerized system, a creator of the objects or an owner of objects, or tags or flags or notes regarding the object.

In the context of the present disclosure, without limiting, the term 'party' implies a participant of a computerized system belonging to the organization or a person operating on behalf of the participant.

In the context of the present disclosure, without limiting, the term 'authorized party' with respect to an object implies a party having sufficient authority for collaboratability of the object, such as an owner of the object, an administrator or an IT personnel or a business-owner with respect to the object.

In the context of the present disclosure, without limiting, the term 'client' implies an individual that does not belong to the organization yet possibly belonging to the computerized system, and/or a party of the organization, any of which operating a computer outside of the organization and/or outside of the computerized system, such as a computer linkable and/or linked to the computerized system, the computer also referred to as a 'client computer'.

For brevity, and unless otherwise specified, referring below to a user with respect to a computerized system implies a party and/or a client of the computerized system.

Generally, referring to a party or a client may imply also a plurality thereof.

In the context of some embodiments of the present disclosure, without limiting, the term collaboratable implies a property or a quality of an entity, such as an object, indicating ability or capacity to participate in collaboration or a collaborated operation with a plurality of parties. Such collaboration may be implemented by updating or amending the content, metadata and/or characteristics of at least a portion of the object.

In the context of some embodiments of the present disclosure, without limiting, the term 'collaborativity' implies a quality or state of being collaboratable as related to an entity such as an object and, likewise, the term 'collaboratability' implies capability and/or capacity for collaboration.

The terms cited above denote also inflections and conjugates thereof.

One technical problem dealt by the disclosed subject matter is determining, in a computerized system having multiple platforms with multitude of objects such as files and folders, policies for data collaboration by users such as parties or clients of the computerized system.

One technical solution according to the disclosed subject matter incorporates, as a groundwork activity, a sub-system, such as a component of the computerized system, for just collecting metadata of objects in the computerized system.

Based on the metadata, an authorized party constructs rules that are stored in a sub-system of the computerized system and by which collaboration of objects can be automatically enabled or disabled by the computerized system. In some embodiments, collaborativity of objects is indicated by data items as codes that are stored by the computerized system, for example, as an extension of the metadata of objects.

Once the rules are constructed, the computerized system, such as by a component or an agent thereof, scans the rules and determines by applying the rules whether an object is collaboratable, thereby setting or maintaining the codes accordingly. In some embodiments, the scanning of the rules may be performed by a computerized device located remotely from the object.

In some embodiments, the scanning of the rules is carried out by a preset and/or determined schedule. Optionally, scanning of the rules is carried out responsive to events of a file system of the computerized system or of a component thereof, for example, a creation of an object and associated metadata thereof. Optionally or additionally, an event may be triggered by a change of collaborated object and/or data thereof. In some embodiments, the scanning of the rules is carried out in real-time or sufficiently fast as practically or effectively as in real-time.

Once the collaborativity of an object is turned off, an attempt to share or collaborate with the object is denied, optionally followed by a message or other method to that effect. Once a collaborativity of an object is revoked, even if the object was previously collaboratively, collaborating and/or sharing with the object is denied.

In some embodiments, the rules are constructed with and/or by an aid of a suitable program. For example, the authorized party fills a computerized pre-set form or forms and the program constructs the rules according to the entered data.

Thus, by constructing and/or composing rules to be applied for objects, policies for data collaboration are instituted.

In some embodiments, high level rules may be constructed by having broad applicable scope and/or by which lower level rules are constructed. For example, a super-rule is constructed implying that objects related to payments are not to be collaboratable. Consequently, rules that apply to objects having credit card or bank transfer data are derived. The derivation of the rules is based, for instance, on the metadata of the objects such as by classifications thereof or by other information such as excerpts of the objects contents as stored in an index of the computerized system. Thus, setting policies for data collaboration is further automated.

In some embodiments, the rules may be constructed as procedure or as any other suitable form, for example, a lookup table.

Generally, objects in the computerized system are continuously changing by accessing and/or modifications and/or creations which may affect the metadata thereof, and consequently the collaborativity of objects may be changed automatically by the rules.

It is noted that collaborativity of an object may be affected or constrained even if the object is determined as collaboratable. For example, an object may not be collaborated with a user that does not have sharing and/or access permission for the object.

It is further noted that, essentially, the solution may be applied to a computerized system that comprises one or just a few platforms.

A potential technical effect of the disclosed subject matter is a computerized system configured for automatically applying policies of data collaboration.

A general non-limiting overview of practicing the present disclosure is presented below, outlining exemplary practice of embodiments of the present disclosure and providing a constructive basis for variant and/or alternative and/or divergent embodiments, some of which are subsequently described.

Generally, one or more rules pertaining to collaborativity to one or more objects of a computerized system are repeatedly scanned and applied by and/or via a repeated process of the computerized system, referred to also a 'scanner. By applying the rules the objects are designated as collaboratable or as non-collaboratable with respect to a user and/or an entity operative on behalf thereof that might want or request to collaborate with the objects.

The rules are constructed and/or defined in the computerized system with respect to one or more objects of the computerized system and are generally stored on a storage device of the computerized system. Optionally, the rules are constructed and/or defined by a party and/or an entity, such as a program, on behalf of an authorized party The rules are based on metadata of the objects, which, at least in some embodiments, are collected and stored by the computerized system by a repeated process of the computerized system, referred to also a 'collector'.

Generally, the rules comprise and/or associated with one or more conditions with respect to the metadata of objects and/or data related to the objects. Thus, application and/or applying of the rules amount to evaluating the conditions, thereby verifying whether or not the conditions are held.

An authorized party of objects may alter and remove and inactivate or suspend rules pertaining to the objects, whether or not the authorized party is the party that defined the rules.

For brevity and unless otherwise specified, the one or more rules are collectively referred to rules; likewise, the one or more objects are collectively referred to as objects.

Figure 1:
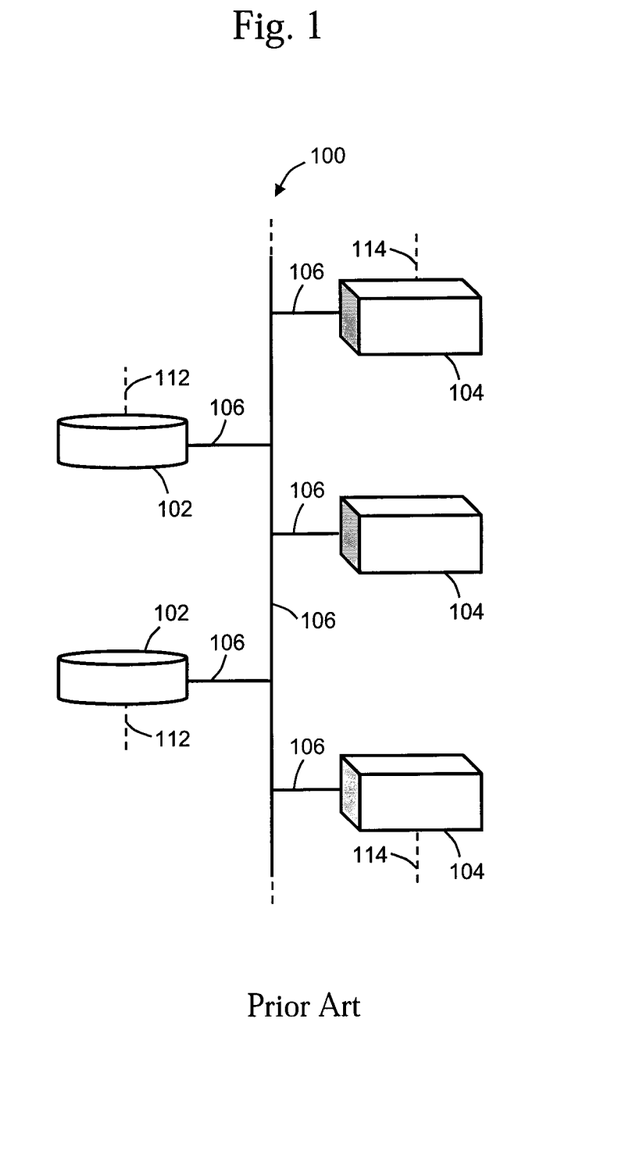
FIG. 1 schematically illustrates a computerized system such as known in the art.

FIG. 1 schematically illustrates a computerized system 100 comprising a plurality of computers, illustrated as three instances of a computer 104, representing any number of computer 104, as indicated by dashed lines 114.

Computerized system 100 further comprises one or more data storage devices, illustrated as two instances of a data storage device 102, representing any number of data storage device 102, as indicated by dashed lines 112. Data storage device 102 generally stores objects or data entities such as folders, files or database records or similar elements, collectively referred to also as objects.

The instances of computer 104 are connected or linked or coupled therebetween and also to the instances of data storage device 102, the connection or linkage illustrated and represented by a network 106.

Figure 2:
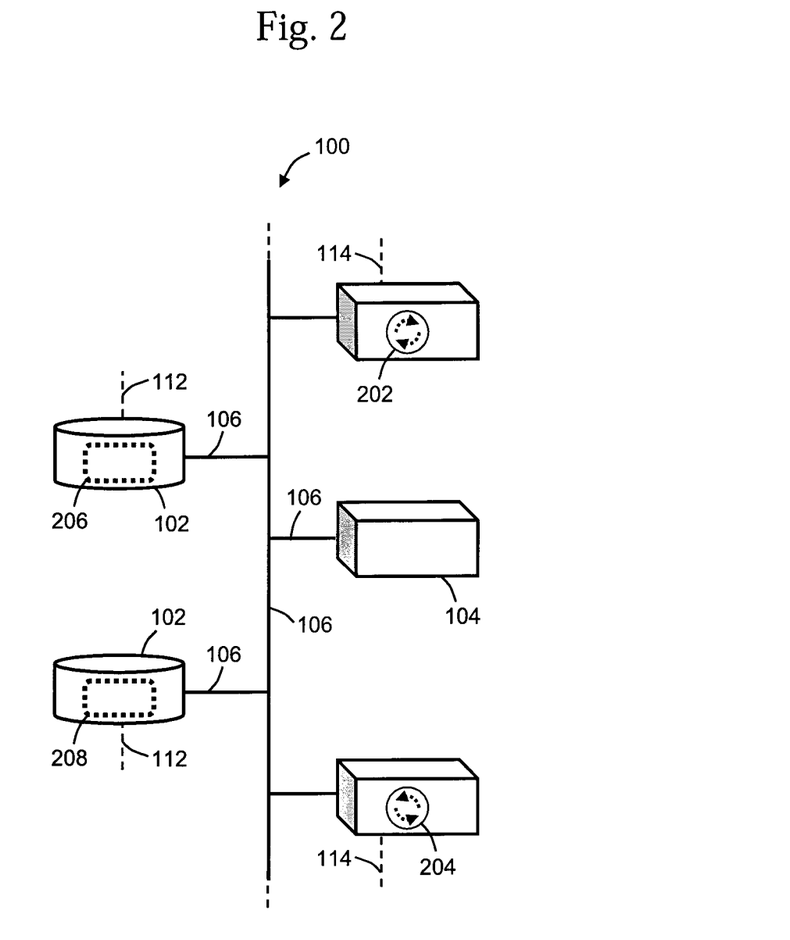
FIG. 2 schematically illustrates a computerized system configured with repeated processes for collecting metadata and applying rules, according to exemplary embodiments of the disclosed subject matter.

FIG. 2 schematically illustrates computerized system 100 configured with a collector 204 and a scanner 202, according to exemplary embodiments of the disclosed subject matter.

The metadata is stored in a metadata construct 208 on one of data storage device 102, and the rules are stored in a rules construct 206 on one of data storage device 102.

By network 106 metadata in metadata construct 208 may be accessed and/or retrieved such as for constructing rules with condition based on metadata of objects.

Optionally, collector 204 and scanner 202 may be implemented and/or employed in the same computer, and that rules construct 206 and metadata construct 208 may be stored on the same data storage device.

In some embodiments, collector 204 operates repeatedly according to a timing regime such as periodically according to preset and/or determined time intervals. Additionally, optionally collector 204 operates responsive to events such as modifications and/or creations and/or deletion of objects. By repeating operation of collector 204 metadata is collected an updated, for example, in case some of the metadata have changes, collector 204 refreshes and/or replaces the metadata.

In some embodiments, scanner 202 operates repeatedly according to a regime such as a timing regime. For example, periodically according to preset and/or determined time intervals. A time interval may be determined such as according to the computational load of the computerized system and/or modification of one or more rules. Additionally, optionally scanner 202 operates responsive to a modification of metadata, such as addition, removal or alteration of metadata of objects.

As rules are scanned by scanner 202, responsively and/or coincidentally, the rules pertaining to an object are applied, that is, conditions of the rules are evaluated, to determine the collaboratability of the object.

In some embodiments, collaboratability of an object is designated by a code, such as a dual valued quantity or a measure as 0/1 or 'False'/'True'. The code may be incorporated in the metadata of the object or as an attribute of the object and/or as any suitable construct such as a part of the index of the computerized system respective to the object.

In some embodiments, collaborativity of an object applies only to a portion or a fraction of the object. Some non-limiting examples are as follows:

Collaborativity of a spreadsheet that applies to one sheet of a multi-sheet spreadsheet document and/or to certain range of cells.

Collaborativity of a textual document that applies to certain paragraphs.

Collaborativity of a presentation that applies only to certain slides.

Collaborativity of a document that applies only to certain pages and/or parts thereof.

Collaborativity of a certain time range of a sound and/or video stream.

Collaborativity of a folder that applies only to some of the files in the folder.

Collaborativity of a file that applies only to certain blocks of the file with respect to blocks of the underlying operating system.

Collaborativity of a file that applies only to certain blocks or segments of a storage device.

In some embodiments, collaborativity of an object is limited, at least partially, based on factors such as designation of an object and/or a part thereof as 'read-only', or if an object and/or a part thereof is being used by other parties not related to collaboration with the object.

As described above, in some embodiments, a rule pertaining to an object is based on conditions of the metadata of the object and/or data related to the object. Further, optionally, the conditions may related and/or based resources of the computerized system such as a date or a time.

In some embodiments, optionally in addition to the metadata of an object, the rules further comprise one or more conditions with respect to a user requesting collaboration with the object, referred to also as a 'requestor'. Thus, an object may be determined to be collaboratable to certain parties only.

Further, in some embodiments, a rule may set and/or restrict the collaboratability of an object for a certain time only, thereby effectively resulting and/or constituting as a time-wise condition of the rule.

In some embodiments, a rule may be derived from a rule data construct such as a form and/or forms and/or other data structure such a lookup table or a variation thereof. In some embodiments, the conditions of the rule may be construed directly from the rule data construct. Optionally or alternatively, the rule may be derived by an accompanying and/or associated program and/or any suitable programmatic entity such as a script, optionally relating to all the rule data constructs.

The rule data construct may be composed by utilizing design services as pull-down menus, radio-buttons and so forth as known in the art and/or variations thereof, which are preset for conditions of the rules and aided by underlying and/or associated program or any suitable programmatic entity.

In some embodiments, a rule may be constructed as a procedure and/or a program in stored in a file of the computerized system. In some embodiments, the rule is subject to run-time interpretation such as a Basic or Java or variants thereof. Optionally or alternatively, the rule is formed in a programming language such as C and is operable after compilation. Optionally, in case a rule is constructed as a programmatic code, yet the rule may be applied according to the logic of the rule's code without necessarily executing and/or interpreting the code. For example, a rule may be constructed as and/or like a Basic or a C code, yet, the code may be deciphered without, respectively, a run-time interpretation or execution of the compiled code.

In some embodiments, an authorized party may decide or determine that some objects are excluded from collaboration; or, figuratively, the objects are categorized in a 'black list'. For example, folders or a device storing confidential personal data of employees are categorized in a black list, and thus objects therein are barred from collaboration, regardless of rules applicable or potentially applicable to the objects.

In some embodiments, an authorized party may decide or determine that some objects are susceptible or compliant for collaboration; or, figuratively, the objects are categorized in a 'white list'. For example, folders or a device storing nonconfidential data are categorized in a while list, and thus objects therein are amenable for collaboration.

In some embodiments, the categorization of objects as in a black list and/or a white list is designated, for example, in the metadata of the objects.

In the exemplary rules presented below, it is assumed, by way of example, that the objects are categorized in a white list.

In some embodiments, an authorized party may decide or determine that some objects are collaboratable; that is, the collaborativity of the objects is imposed or enforced, optionally regardless of any rules pertaining to the objects and optionally regardless of any user.

It is noted that unlike objects with imposed collaborativity which are set as collaboratable, objects that are not imposed for collaborativity are collaboratable only responsive to requested collaborativity by a user.

In some embodiments, objects with imposed collaborativity are not necessarily collaboratable with any user, but, rather are collaboratable with certain users or group of users and/or certain users or group of users are excluded from collaborativity.

In some embodiments, the users that are allowed to collaborate with objects imposed for collaborativity are designated as such, for example, in the metadata of the objects or in some data structure of the computerized system such as data structure of the scanner.

In some embodiments, objects categorized in a black list are excluded from enforcing or imposing collaborativity.

Generally, plain rules are scanned and applied by any order. Optionally, in some embodiments, plain rules may be assigned precedence ranks.

An exemplary rule in pseudo code pertaining to an object OB is presented in Table-1 below.

TABLE 1

```
WITH OB:
    If classification == 'sales' AND
    type == 'spreadsheet' AND
    title == 'product X price'
    THEN collaboratable = True
    ELSE collaboratable = False
END WITH
```

The OB object is an object of the computerized system and may be referred to by the full path thereof (e.g. as a URL) or by any suitable manner, such as with a shortened path as known in the art. Thus, the rule of Table-1 pertains to object OB.

The classification and type and title are part of the metadata of object OB and/or related to the metadata thereof. Further, the reference to collaboratable implies an attribute of object OB, such as a code described above.

Briefly, the rule as in Table-1 implies that an object OB may be collaborated with other parties as long as the object belongs to sales class and the type of the object is a spreadsheet and the title relates to the price of product X.

Thus, for example, other parties of the computerized system, such as a party of marketing, may participate in evaluating an intended price for product X.

Another exemplary rule in pseudo code is presented in Table-2 below.

TABLE 2

```
WITH OB:
    If classification == 'management' AND
    classification of requestor == 'business'
    THEN if date < 1 November 2014
    THEN collaboratable = True
    ELSE collaboratable = False
END WITH
```

Briefly, in a similar manner as the rule of Table-1 above, the rule as in Table-2 pertains to object OB and implies that an object belonging to the management class may be collaborated with a requestor that is classified as a business up to 1 Nov. 1, 2014. Thus, for example, a business party belonging to or associated with the computerized system and/or a client may collaborate with objects related to management decisions, yet not later than Nov. 1, 2014.

An exemplary rule data construct as a form according to the rule depicted in Table-1 and with a time constraint of the rule depicted in Table-3 is presented in Table-3 below.

TABLE 3

| Object | OB |
| --- | --- |
| Classification | management |
| Permissions | -any- |
| Type | spreadsheet |
| Title | product X price |
| From | -any- |
| Up to | 1 Nov. 2014 |

Thus, the conditions in a form as in Table-3 may be applied directly or be transformed into a procedural construct as a script or a program.

A rule as described above, either and/or as a procedure or a rule data construct, are referred to also as a plain rule, as opposed to super-rule described later below.

Another exemplary rule in pseudo code is presented in Table-4 below.

TABLE 4

```
WITH OB:
    If permission == 'HR' AND
    Activity.accessed == TODAY( ) - 7
    THEN collaboratable = True
    ELSE collaboratable = False
END WITH
```

Thus, evidently, the exemplary rule of Table-4 implies that the object OB is collaboratable only if the object belongs or of the Human Resources (HR) department and was accessed in the last seven days.

Generally, rules are scanned and applied repeatedly. Yet, in some embodiments, rules are applied according to predefined and/or determined prerequisites or constraints such as date or time. For example, rules to be applied on a first day of a month or a week, or a first week of a quarter, morning hours such as from 10 am to 12 pm.

In some embodiments, an authorized party that defines a rule also defines the prerequisites according to which the rule is applied. For example, the prerequisites may be defined in the scanner or data thereof, such as in or by a queue maintained by the scanner or by the computerized system or a component thereof.

Optionally, the prerequisites are defined in the rules, and as the scanner repeatedly scans the rules, only the rules that meet the prerequisites are applied.

An exemplary rule akin to the rule of Table-1 with an additional time prerequisite is presented in Table-5 below.

TABLE 5

When: DATE( ).day==1
WITH OB:
If classification == 'sales' AND
type == 'spreadsheet' AND
title == 'product X price'
THEN collaboratable = True
ELSE collaboratable = False
END WITH Thus, as the scanner encounters or refers to the rule of Table-5, the scanner checks the 'When' prerequisite, and if the current data is the first day of the current month the rule with the conditions as that of Table-1 is applied, otherwise the rule is ignored.

In some embodiments, other prerequisites may be used to direct or limit the applicability of rules. For example, the computerized system or component thereof is running a maintenance process such as backup or antivirus with an indication thereof. Thus, a prerequisite to that effect may be defined in a rule, as shown in an exemplary manner in Table-6 below.

TABLE 6

When: NOT MAINTENANCE.backup

Accordingly, by way of example, a rule having such a 'When' prerequisite would be applied only when a backup process is not running.

In some embodiments, a plurality of 'When' prerequisites may be used in a rule, optionally with logical relations therebetween, where the prerequisites with the optional logical relations should be met for applying the rule.

In some embodiments, a rule may be 'paused' or disabled, namely, it is still maintained yet is inactive. Rules are generally disabled by a party that defined the rules and/or by an appropriate authorized party. In some embodiments, a disabled rule is designated as such, for example, in the rule or in some data structure such as of the scanner. Thus, the scanner skips and/or refrains from performing disabled rules. A disabled rule may be reinstituted or enabled, generally by the party that defined the rule and/or by an appropriate authorized party.

It is noted that a plurality of rules may pertain to an object, optionally where the order of performance of the rules is designated or indicated in the rule or in some data structure such as of the scanner.

It is further noted that a rule may pertain to a plurality of objects.

In some embodiments, in order to further automate the construction of rules, one or more super-rules may be constructed by an authorized party of the computerized system, such as by a member of the IT personnel or a business manager of the computerized system.

A super-rule is constructed and/or formulated to derive therefrom one or more plain rules, either programmatically and/or according to defined and/or selected conditions such as in forms. Optionally or additionally, a super-rule is devised to modify existing plain rules. Further optionally or additionally, a super-rule is devised to affect plain rules and/or to add conditions to plain rules and/or modify conditions of plain rules. Thus, super-rules are devised to affect plain rules by creation of plain rules and/or modification thereof.

In some embodiments, super-rules are scanned and applied, namely, expanded to plain rules. In some embodiments, the super-rules are scanned periodically according to some time regime, optionally with larger time intervals relative to scanning of plain rules. Optionally or alternatively, super-rules are applied responsive to occurrences or events such as creation and/or modifications of objects and/or metadata thereof.

An exemplary data construct as a form for an exemplary super-rule is presented in Table-7 below.

TABLE 7

| Classification | finance |
| Containing | credit |
| Collaboratability | False |

By way of example, the super-rule as depicted in Table-7 would yield rules by which any object classified as finance and containing and/or characterized by terms related to credits or credit cards would not be collaboratable.

By the example of Table-7 the exemplary plain rule akin to the rule of Table-1 would be modified and/or affected to yield a form of an exemplary rule as in Table-8 below.

TABLE 8

If classification == 'sales' AND
type == 'spreadsheet' AND
title == 'product X price' AND NOT 'sales by credit cards')
THEN collaboratable = True
ELSE collaboratable = False Thus, whatever the conditions of the original plain rule, and additional constraint is added by the super-rule exemplified in Table-7. For example, as the plain rules are scanned, additionally, the super-rule of as of Table-8 is applied to modify the plain rules.

In some embodiments, a super-rule may set or designate the order of performance of plain rules derived therefrom. Also, in some embodiments, a super-rule may disable and optionally later enable the plain rules and/or a part of the plain rules derived therefrom.

In some embodiments, a super-rule may be defined to set or categorize objects in a black list and/or in a white list described above, thus enabling to dynamically set and/or modify the black list and/or white list in a convenient and dynamic manner.

In some embodiments, a super-rule may be defined to set or designate objects as imposed for collaborativity which were described above, thus enhancing automation of collaborativity conditions and/or circumstances.

In some embodiments, a super-rule may also derive a rule with date and time prerequisites or other prerequisites as described above.

In some embodiments, a super-rule may derive an additional attribute and/or metadata and/or contents of objects that would be incorporated in the metadata collected by the collector. For example, keywords such as credit or cards may be obtained from the contents of objects, such as from an index of the computerized system, and added and/or incorporated in the metadata of the objects, and used as conditions of a super-rule.

In some embodiments, a super-rule may be handled as a plain rule yet with a more comprehensive and/or general scope. Taking the exemplary super-rule of Table-7, any object classified as finance and related to credit is designated as non collaboratable with respect to any party and/or an entity operative on behalf thereof and/or a client, regardless of other conditions and/or rules that might be applicable to the object.

Generally, super-rules are scanned and applied by any order. Optionally, in some embodiments, super-rule may be assigned precedence ranks.

The relation between plain rules and super-rules may be regarded, metaphorically at least, as a relation between rules of a lowest level or rank and rules of a top level or rank, respectively.

Thus, in some embodiments, the 'gap' between super-rules and plain rules may be supplemented by rules of intermediate level or rank, referred to also as intermediate rules, thus forming a hierarchy of rules.

Generally, intermediate rules resemble super-rules by having capabilities such as derivation of rules of lower ranks, and/or categorization of objects in a black list or in a white list, and/or deriving additional metadata or contents of objects, and/or having broader scope than rules of a lower level.

When defining an intermediate rule an authorized party sets or designates the rank or level of the rule, thus setting the relative rank between the rules. The ranking may be set in the rule or otherwise designated such as in some data structure of the computerized system such as data structure of the scanner.

In some embodiments, a range of ranks is defined and the intermediate rules are assigned a rank within the range. Optionally, the range is defined to be sufficiently large so that ranks of the intermediate rules may be sparsely assigned, allowing sufficient intervals for future intermediate rules or for reshuffle of the ranks order. Optionally or alternatively, other methods for dynamically ordering of the ranks may be used, for example, a dynamic list where with linkage or association with the rules such as a linked list. For consistency, in some embodiments, super-rules are assigned the highest rank and plain rules are assigned the lowest such as zero.

In some embodiments, a super-rule and/or an intermediate rule assigns a rank to rules derived therefrom. For example, the super-rule and/or intermediate rule comprise therein the rank for derived rules and further implement the rank in the derived rules or optionally designate the rank such as in some data structure of the computerized system such as data structure of the scanner.

Intermediate rules may have different conditions and/or scopes, possibly with overlapping or mutual conditions and scopes. Therefore, in order to resolve possible or potential conflicts, the scanner scans and applies the rules in an order according to the rank. Thus, firstly super-rules are applied, and subsequently intermediate rules are applied in a precedence order according to the ranks thereof, those with higher ranks preceding those with lower ranks and, lastly, plain rules are applied.

In some cases or embodiments, a plurality of rules may have the same rank or precedence. Generally in such cases, rules of the same rank are scanned and applied by any order. Optionally, in some embodiments, the rules may be assigned precedence ranks for performance thereof.

In some embodiments, the creators of rules may be designated, such as in the rules or in any data construct of the computerized system, and the precedence of rules having the same rank is according to the creators thereof. For example, rules defined by an IT manager would precede rules defined by a HR manager. Optionally, rules defined by some authorized parties override and/or disable the performance of rules defined by inferior parties. For example, rules defined by an IT manager would override rules defined by a HR manager.

Figure 3:
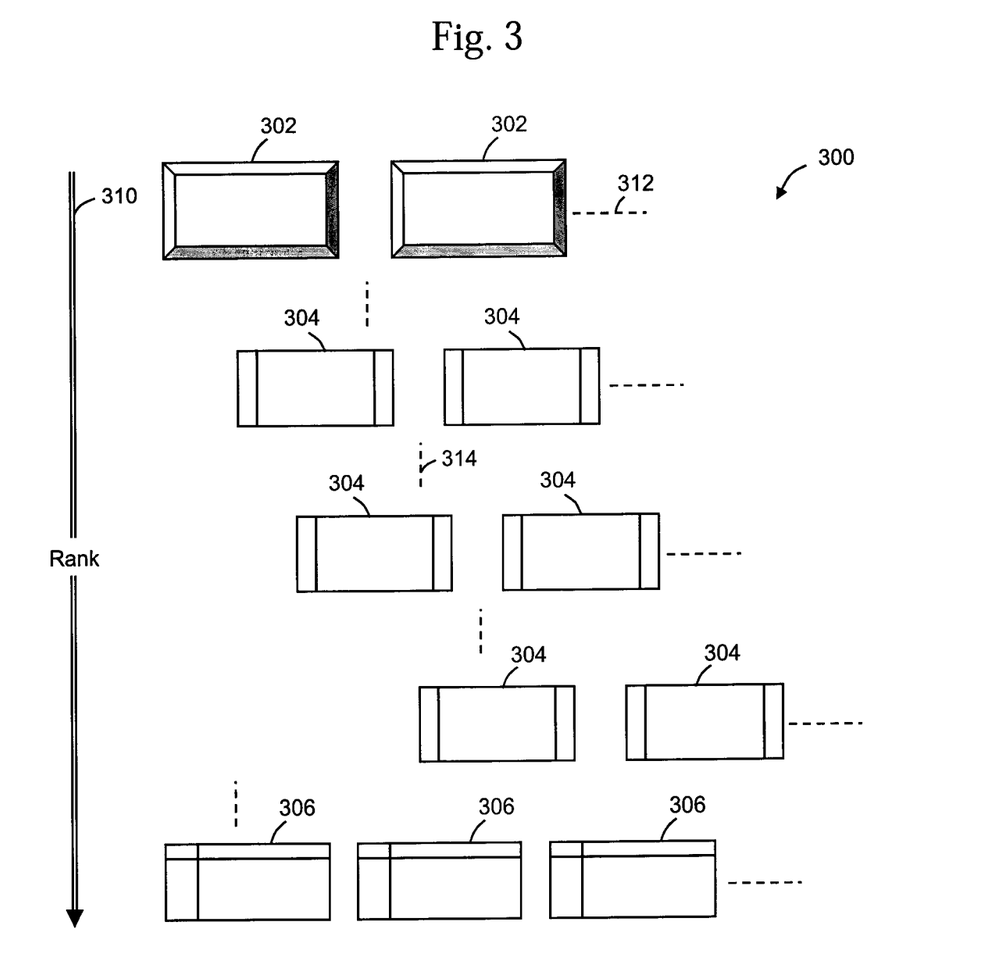
FIG. 3 schematically illustrates a hierarchy of rules, according to exemplary embodiments of the disclosed subject matter.

FIG. 3 schematically illustrates a hierarchy 300 of rules, according to exemplary embodiments of the disclosed subject matter, where an arrow 310 indicates the rank of the rules in hierarchy 300 in a descending order.

At the top level are schematically illustrated super-rules as two instances of a super-rule 302, whereas at the lowest level are schematically illustrated plain rules as three instances of a plain rule 306.

In intermediary levels or ranks between the top level and the lowest one are schematically illustrated intermediary rules as three pairs of instances of an intermediary rule 304.

The horizontal dashed lines, such as a dashed line 312, schematically indicate that at a certain level any number of rules may be defined or present. Likewise, the vertical dashed lines, such as a dashed line 314, schematically indicate that any number of levels or ranks of the intermediary rules may be defined or present.

It is noted that hierarchy 300 may comprise only plain rule, and optionally only one super-rule. The intermediary rules may be absent or may be present in any number in any level, subject to the range of levels in case such is defined or maintained.

Figure 4A:
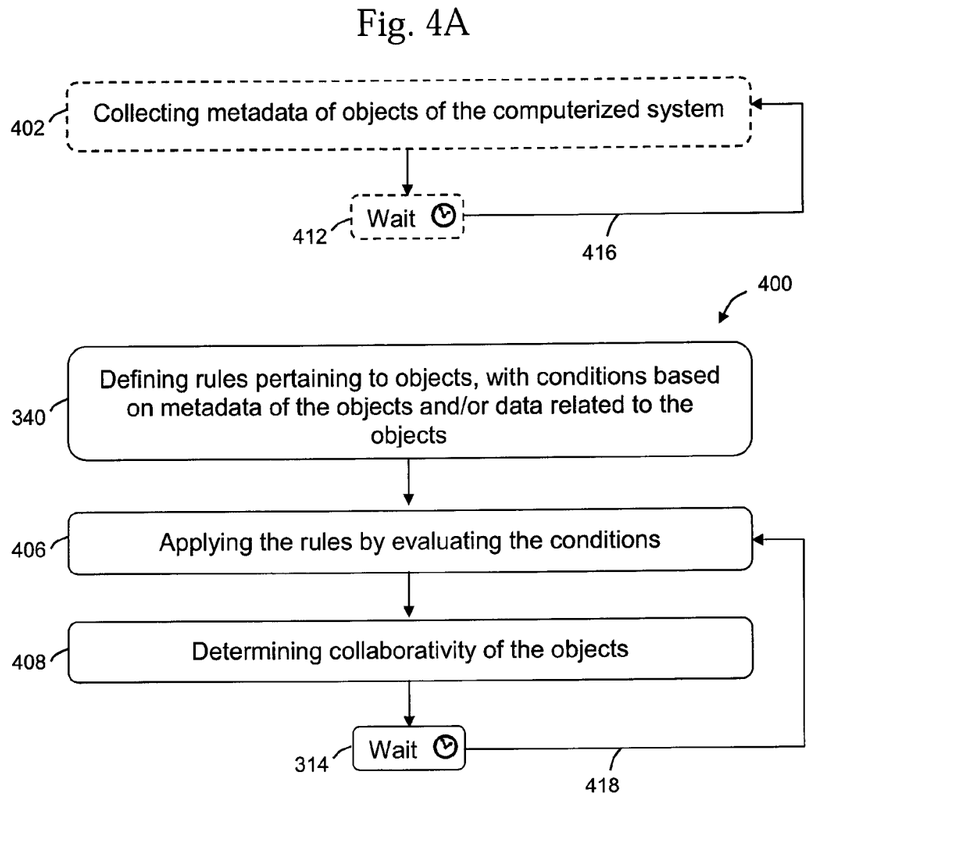
FIG. 4A outlines operations in employing rules in a computerized system, according to exemplary embodiments of the disclosed subject matter.

FIG. 4A outlines operations in employing rules in a computerized system, such as computerized system 100 and/or a variation thereof, according to exemplary embodiments of the disclosed subject matter.

In operation 402, at least optionally, metadata of one or more objects of the computerized system, collectively referred to as objects, are collected in the computerized system. Further optionally, the metadata is stored and/or otherwise constructed for accessing and/or retrieval of the metadata.

Operation 402 is repeated after delays such as periodically, as indicated, respectively, by an arrow 416 and a delay mechanism such as a timer, as indicated by delay functionality 412, thus that metadata is further collected and/or updated.

In some embodiments, the metadata of the objects are obtained by different mechanisms, such as maintenance process or process of the computerized system, and may further be accessed and/or retrieved.

Thus, at least implicitly, metadata of the objects is considered to be available and repeatedly updated.

In operation 404 rules pertaining to objects are defined with conditions concerning collaborativity of the objects. The conditions are based on metadata of the objects, and/or on data related to the objects such as other objects and/or metadata thereof. Optionally, the conditions relate and/or based on information provided by the computerized system such as date and time.

The rules are defined by an authorized party of the objects the rules pertain to, or by parties and/or entities such as program operating on behalf of the authorized party.

The rules may be added and/or updated and/or modified during the operation of the computerized system and/or any component thereof.

In operation 406 the rules are applied by evaluating the conditions of the rules.

In operation 408 collaborativity of the objects to which the rules pertain is determined by the outcome of the evaluation of the conditions. For example, if the conditions are constructed positively for collaboratively, then if all the conditions are met then the objects are set as collaborative. Or, for example, if the conditions are constructed for denying collaboratively then if all the conditions are met the objects are set as non-collaborative. Optionally, the conditions may be a mixture for positive and negative collaboratively, and the objects are set as collaborative or as non-collaborative accordingly.

The sequence of operation 406 and operation 408 is repeated with intervening delays, as indicated, respectively, by an arrow 418 and a delay mechanism 414. The repetition of operation 406 and operation 408 may be periodic such as by a timer control. Optionally, the repetition of operation 406 and operation 408 is invoked or triggered by modification of metadata of objects. Thus new and/or modified rules are applied and removed rules are ineffective whatsoever.

In some embodiments, operation 404 is performed once. Optionally or alternatively, operation 404 is performed a plurality of times, for example, responsive to determination for collaboratability of objects such as a request from a party of the computerized system or from a client. Further, operation 404 may be carried out several times, such as by splits thereof, according to the object to which the rules pertain or would pertain. Further, operation 404 may be carried out several times, such as by splits thereof, for additions and/or modifications of rules.

It is noted that the repetition of operation 402 and the repetition of the sequence of operations 406 and operation 408 are independent of each other, and may be operative by different processes of the computerized system and optionally may operative on different components of the computerized system.

The operations from operation 404 to operation to 408 are also referred to as operations 400.

Figure 4B:
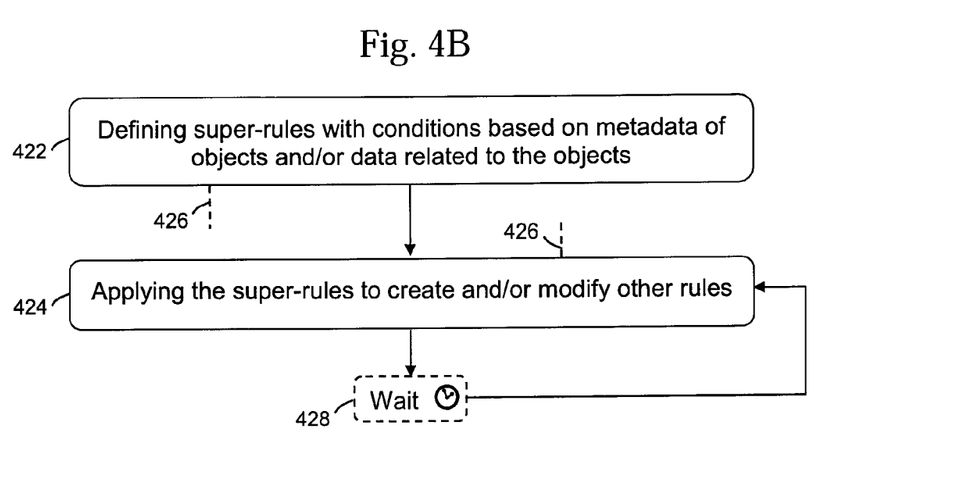
FIG. 4B outlines operations augmenting the operations of FIG. 4A with super-rules, according to exemplary embodiments of the disclosed subject matter.

FIG. 4B outlines operations augmenting the operations of FIG. 4A with super-rules, according to exemplary embodiments of the disclosed subject matter.

In operation 422 super-rules with conditions based on metadata of objects and/or data related to the objects are defined. The super-rules are defined by an authorized party on behalf thereof, such as an IT manager of the computerized system.

In operation 424 the super-rules are applied according to the conditions thereof to create one or more rules akin to the rules defined in operation 404 and/or to modify rules as or akin to the rules defined in operation 404.

Operation 424 is repeated based on a delay mechanism akin to delay mechanism 414. Optionally, operation 424 is invoked responsive to modification of objects and/or metadata thereof.

Operation 422 and operation 424 may be carried out independently of operations 400. Optionally, operation 422 may be carried out together and/or in linkage with operation 404, bearing the implication of the times of performance and/or circumstance noted for operation 404. Further optionally, operation 422 may be comprised in operation 404. Optionally, after operation 422 is carried out, operation 424 is performed consecutively to operation 404 or consecutively to operation 408. Variations of the performance of operation 422 and/or of operation 424 with respect to an operation of operations 400, and optionally other possible variations, are indicated schematically by dashed line 426.

Figure 4C:
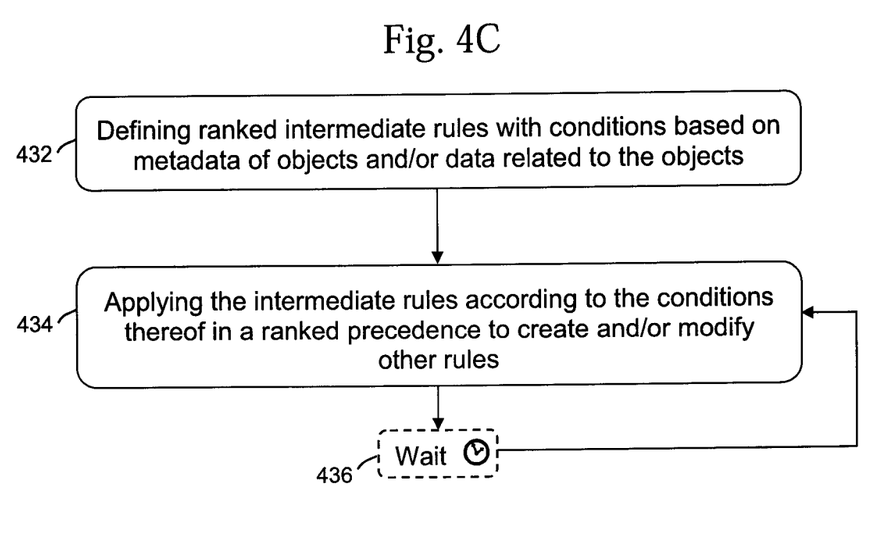
FIG. 4C outlines operations augmenting the operations of FIG. 4A with intermediary rules, according to exemplary embodiments of the disclosed subject matter.

FIG. 4C outlines operations augmenting the operations of FIG. 3A with intermediary rules, according to exemplary embodiments of the disclosed subject matter.

In operation 432 intermediary rules with conditions based on metadata of objects and/or data related to the objects are defined by ranks in a hierarchical order. The intermediary rules are defined by an authorized party on behalf thereof, such as an IT manager of the computerized system.

In operation 434 the intermediary rules are applied according to the conditions thereof to create one or more rules akin to the rules defined in operation 404 and/or to modify rules as or akin to the rules defined in operation 404, the application of the intermediary rules is carried out in a precedence order according to the ranks.

Operation 434 is repeated based on a delay mechanism akin to delay mechanism 414. Optionally, operation 434 is invoked responsive to modification of objects and/or metadata thereof.

It is emphasized that referring to rules of any kind and/or objects and/or conditions may imply, according to the relevant circumstances, one rule and/or one object and/or one condition, respectively. Likewise referring to metadata may imply one element of the metadata of an object and/or one attribute of an object. For example, if only one rule was defined, then referring to rules imply one rule.

There is thus provided according to the present disclosure a computerized method for managing collaboration in a computerized system, comprising repeatedly applying any one of rules defined in the computerized system pertaining to objects of the computerized system, wherein the any one of the rules comprises an at least one condition concerning collaborativity of an object to which the any one of the rules pertains and the at least one condition is based on metadata of the object, by evaluating any one of conditions in the any one of the rules, thereby determining collaborativity of any one of the objects to which the any one of the rules pertains, wherein the metadata of the object comprises at least one of a permission to access the object, a content classification of the object, an audit trail of activities with the object, a type of the object, a users group of the computerized system, a creator of the object, an owner of objects, or any combination thereof, and wherein the computerized method is carried out by an at least one computerized apparatus of the computerized system.

In some embodiments, at least one rule of the any one of rules comprises at least one prerequisite effecting the evaluation of conditions of the at least one rule.

In some embodiments, metadata of objects of the computerized system are collected by a process operative in the computerized system.

In some embodiments, the at least one condition is based on data related to the object to which the any one of the rules pertains.

In some embodiments, the any one of the rules are defined by an authorized party of the computerized system having authority with respect to the objects to which the any one of the rules pertains.

In some embodiments, comprising further repeatedly applying an at least one super-rule defined by an authorized party of the computerized system comprising at least one condition concerning collaborativity of objects of the computerized system, thereby defining at least one of the any one of the rules according to the at least one condition.

In some embodiments, the method further comprises repeatedly applying an at least one super-rule defined by an authorized party of the computerized system comprising at least one condition concerning collaborativity of objects of the computerized system, thereby modifying at least one of the any one of the rules according to the at least one condition.

In some embodiments, repeatedly applying the any one of the rules is according periodically according to a timing regime.

In some embodiments, the timing regime is periodic according to a preset interval.

In some embodiments, wherein the timing regime is periodic according to determined intervals.

In some embodiments, wherein repeatedly applying the any one of the rules is responsive to modification of metadata of the objects to which the any one of the rules pertains.

In some embodiments, the at least one condition concerning collaborativity of the object to which the any one of the rules pertains comprises condition concerning collaborativity of a part of the object to which the any one of the rules pertains.

In some embodiments, the method comprises further repeatedly applying a plurality of intermediate rules ranked in a hierarchy and defined by an authorized party of the computerized system comprising at least one condition concerning collaborativity of objects of the computerized system, thereby defining at least one of the any one of the rules according to the at least one condition.

There is thus further provided according to the present disclosure a computerized system for managing collaboration, comprising an at least first computerized apparatus configured for defining rules pertaining to objects of the computerized system with conditions concerning collaborativity of the objects to which the rules pertain based on metadata of the objects, and an at least second computerized apparatus configured for repeatedly applying the rules by evaluation of the conditions to determined collaborativity of the objects to which the rules pertain, wherein the metadata of the objects comprises at least one of a permission to access the object, a content classification of the object, an audit trail of activities with the object, a type of the object, a users group of the computerized system, a creator of the object, an owner of objects, or any combination thereof.

In some embodiments, wherein at least one rule of the rules comprises at least one prerequisite effecting the evaluation of conditions of the at least one rule.

In some embodiments, the system further configured for collecting metadata of the objects to which the rules pertain.

In some embodiments, the conditions are based on data related to the objects to which the rules pertain.

In some embodiments, the system further configured for defining super-rules with conditions concerning collaborativity of objects of the computerized system, and further configured for repeatedly applying the super-rules, consequently affecting other rules.

In some embodiments, wherein the at least first computerized apparatus and the at least second computerized apparatus are the same computerized apparatus.

In some embodiments, the conditions concerning collaborativity of the objects to which the rules pertain comprises conditions concerning collaborativity of at least a part of at least one of the objects to which the rules pertain.

In some embodiments, the computerized system is further configured for defining a plurality of intermediate rules in a ranked hierarchy with conditions concerning collaborativity of objects of the computerized system, and further configured for repeatedly applying the intermediate rules, consequently affecting other rules.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

Unless otherwise specified, the term 'about' with respect to a numerical value implies a number within an inclusive range of −10% to +10% of the respective numerical value.

When a range of values is recited, it is merely for convenience or brevity and includes all the possible subranges as well as individual numerical values within and about the boundary of that range. Any numeric value, unless otherwise specified, includes also practical close values enabling an embodiment or a method, and integral values do not exclude fractional values. A sub-range values and practical close values should be considered as specifically disclosed values.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for managing collaboration in a computerized system, comprising:
repeatedly applying any one of rules defined in the computerized system pertaining to objects of the computerized system, wherein the any one of the rules is assigned a rank or level within a range of ranks, and further wherein the any one of the rules comprises an at least one condition concerning collaborativity of an object to which the any one of the rules pertains, and the at least one condition is based on metadata of the object, by evaluating any one of conditions in the any one of the rules, thereby determining collaborativity of any one of the objects to which the any one of the rules pertains,
wherein the metadata of the object comprises at least one of a permission to access the object, a content classification of the object, an audit trail of activities with the object, a type of the object, a users group of the computerized system, a creator of the object, an owner of objects, or any combination thereof,
wherein applying the any one of the rules is in an order according to each rule's rank or level,
wherein the range is defined to be large enough in order for ranks of the any one of the rules may be sparsely assigned, allowing sufficient intervals for future rules or for reshuffle of the ranks order, and
wherein the computerized method is carried out by an at least one computerized apparatus of the computerized system.

2. The method according to claim 1, wherein at least one rule of the any one of rules comprises at least one prerequisite effecting the evaluation of conditions of the at least one rule.

3. The method according to claim 2, wherein metadata of objects of the computerized system are collected by a process operative in the computerized system.

4. The method according to claim 1, wherein the at least one condition is based on data related to the object to which the any one of the rules pertains.

5. The method according to claim 1, wherein the any one of the rules are defined by an authorized party of the computerized system having authority with respect to the objects to which the any one of the rules pertains.

6. The method according to claim 1, comprising further repeatedly applying an at least one super-rule defined by an authorized party of the computerized system comprising at least one condition concerning collaborativity of objects of the computerized system, thereby defining at least one of the any one of the rules according to the at least one condition.

7. The method according to claim 1, comprising further repeatedly applying an at least one super-rule defined by an authorized party of the computerized system comprising at least one condition concerning collaborativity of objects of the computerized system, thereby modifying at least one of the any one of the rules according to the at least one condition.

8. The method according to claim 1, wherein repeatedly applying the any one of the rules is according periodically according to a timing regime.

9. The method according to claim 8, wherein the timing regime is periodic according to a preset interval.

10. The method according to claim 8, wherein the timing regime is periodic according to determined intervals.

11. The method according to claim 1, wherein repeatedly applying the any one of the rules is responsive to modification of metadata of the objects to which the any one of the rules pertains.

12. The method according to claim 1, wherein the at least one condition concerning collaborativity of the object to which the any one of the rules pertains comprises condition concerning collaborativity of a portion of the object to which the any one of the rules pertains.

13. The method according to claim 1, comprising further repeatedly applying in a ranked hierarchy a plurality of intermediate rules defined by an authorized party of the computerized system and comprising at least one condition concerning collaborativity of objects of the computerized system, thereby defining at least one of the any one of the rules according to the at least one condition.

14. A computerized system for managing collaboration, comprising:
an at least first computerized apparatus configured for defining rules pertaining to objects of the computerized system with conditions concerning collaborativity of the objects to which the rules pertain based on metadata of the objects, wherein each rule is assigned a rank or level within a range of ranks, and
an at least second computerized apparatus configured for repeatedly applying the rules by evaluation of the conditions to determine collaborativity of the objects to which the rules pertain,
wherein the metadata of the objects comprises at least one of a permission to access the object, a content classification of the object, an audit trail of activities with the object, a type of the object, a users group of the computerized system, a creator of the object, an owner of objects, or any combination thereof, and further wherein applying the rules is in an order according to each rule's rank or level, and wherein the range is defined to be large enough in order for ranks of the any one of the rules may be sparsely assigned, allowing sufficient intervals for future rules or for reshuffle of the ranks order.

15. The computerized system according to claim 14, wherein at least one rule of the rules comprises at least one prerequisite effecting the evaluation of conditions of the at least one rule.

16. The computerized system according to claim 14, further configured for collecting metadata of the objects to which the rules pertain.

17. The computerized system according to claim 14, wherein the conditions are based on data related to the objects to which the rules pertain.

18. The computerized system according to claim 14, further configured for defining super-rules with conditions concerning collaborativity of objects of the computerized system, and further configured for repeatedly applying the super-rules, consequently affecting other rules.

19. The computerized system according to claim 14, wherein the at least first computerized apparatus and the at least second computerized apparatus are the same computerized apparatus.

20. The computerized system according to claim 14, wherein the conditions concerning collaborativity of the objects to which the rules pertain comprises conditions concerning collaborativity of at least a portion of at least one of the objects to which the rules pertain.

21. The computerized system according to claim 14, further configured for defining, in a ranked hierarchy a plurality of intermediate rules with conditions concerning collaborativity of objects of the computerized system, and further configured for repeatedly applying the intermediate rules, consequently affecting other rules.

22. The method according to claim 1, wherein rules of the same rank are applied by any order.

23. The computerized system according to claim 14, wherein rules of the same rank are applied by any order.

24. The method according to claim 1, wherein applying rules with higher ranks precedes applying rules with lower ranks.

25. The computerized system according to claim 14, wherein applying rules with higher ranks precedes applying rules with lower ranks.

* * * * *